June 12, 1934.　　　R. ROTH ET AL　　　1,962,877
HAM MOLD
Filed Nov. 5, 1931　　　2 Sheets-Sheet 1

INVENTORS
René Roth
Boleslaw Ritthamer
Arthur W. Pollock
John Ivor Johnson
BY
Fred C. Matheny
ATTORNEY

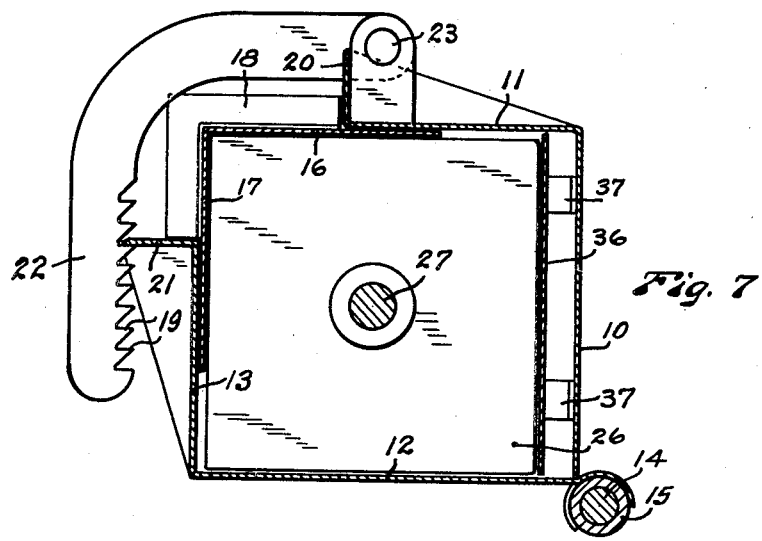
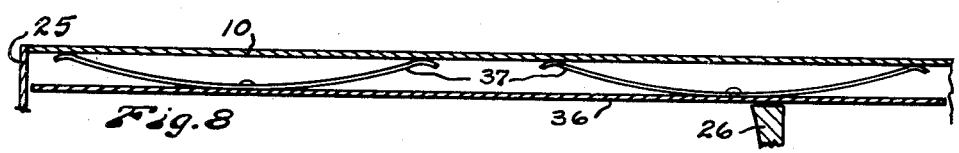
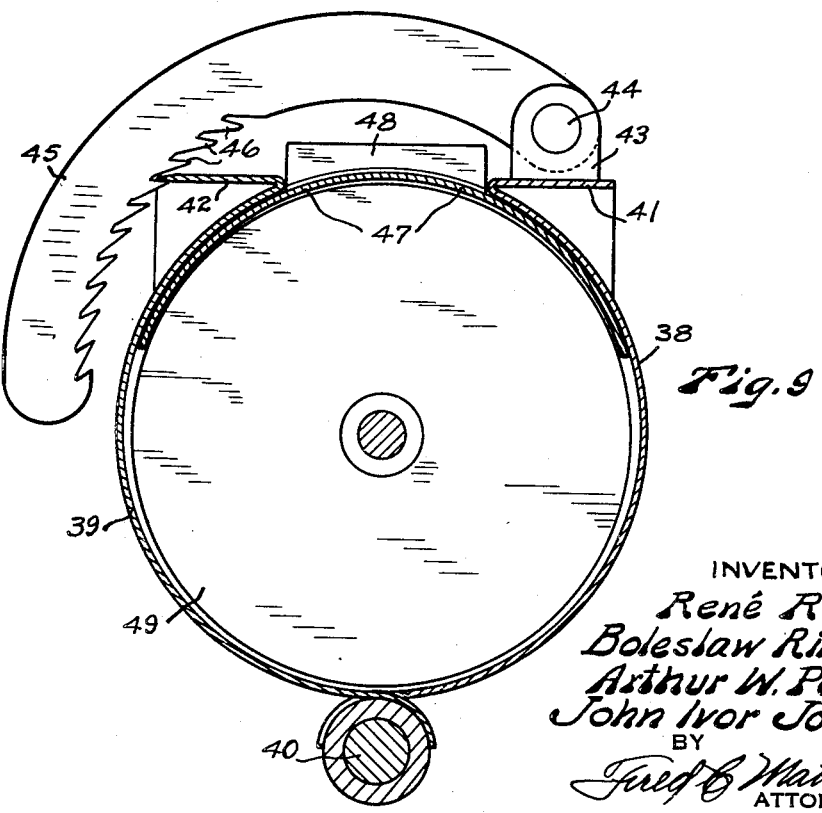

Patented June 12, 1934

1,962,877

UNITED STATES PATENT OFFICE 1,962,877

HAM MOLD

René Roth, Arthur W. Pollock, and John Ivor Johnson, Seattle, and Boleslaw Ritthamer, Port Townsend, Wash.

Application November 5, 1931, Serial No. 573,080

7 Claims. (Cl. 100—57)

Our invention relates to improvements in meat molds and our present invention is in the nature of an improvement on the apparatus for molding hams, disclosed in Patent Number 1,364,411 issued to René Roth and Boleslaw Ritthamer, on January 4, 1921.

The general object of our invention is to provide a meat mold of simple and efficient construction which will mold a ham or batch of meat or like material to a predetermined uniform cross sectional dimension regardless of variations in the size or weight of said ham or batch of meat or like material.

Another object is to provide a meat mold having an adjustable spring pressed, readily releasable end plate which may be set to vary the length of the meat compartment of said mold to correspond to the size of the ham or batch of material which is being placed in the mold and which will maintain the ham or other material under constant pressure during the cooking operation.

Another object is to provide a meat mold which may be manually closed to predetermined limits after the meat is partially cooked thus insuring a finished product of a desired cross sectional size.

Other objects are to provide a meat mold of simple and strong construction which is reliable and efficient in operation and not expensive to manufacture.

Other and more specific objects will be apparent from the following description taken in connection with the accompanying drawings.

In the drawings Figure 1 is a top plan view of a preferred form of meat mold constructed in accordance with our invention.

Fig. 7 is a cross sectional view on a larger scale of a modified form of our invention in which one side of the mold is formed by a resiliently supported presser plate.

Fig. 8 is a fragmentary sectional view of the resiliently supported presser plate and a portion of the adjacent side wall of the mold.

Fig. 9 is a cross section of a cylindrical mold constructed in accordance with our invention.

Like reference numerals designate like parts throughout the several views.

Figure 1:
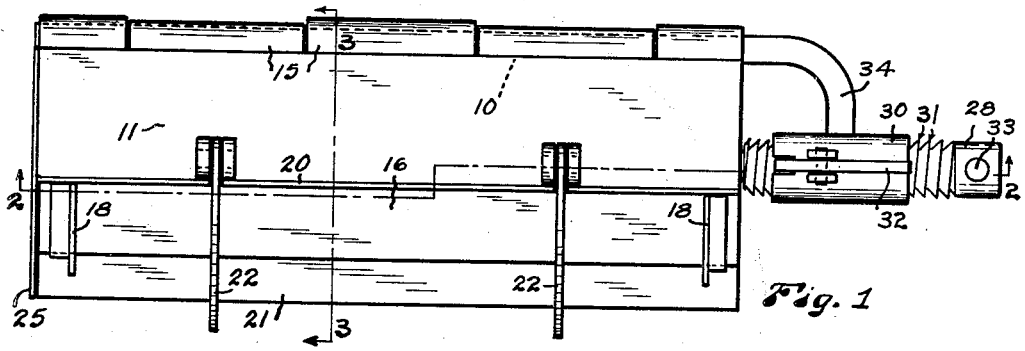
Figure 2:
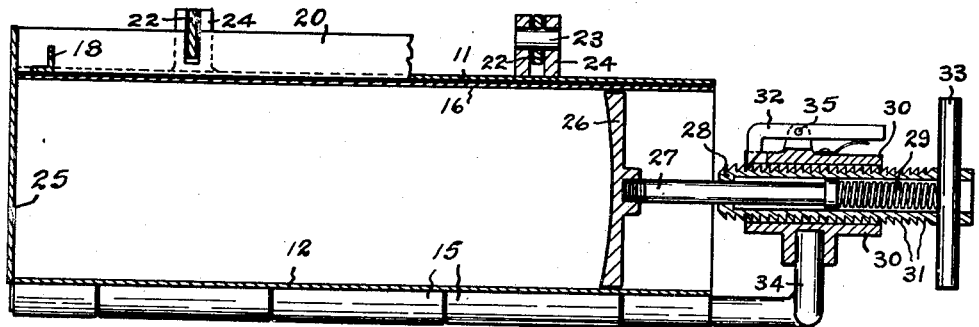
Fig. 2 is a sectional view of the same substantially on broken line 2—2 of Fig. 1.
Figure 4:
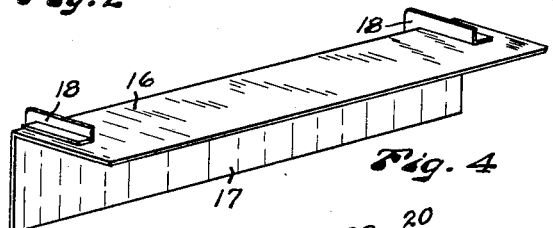
Figs. 4, 5 and 6 are detached perspective views on a smaller scale of the three main parts of the mold housing shown in the preceding figures.
Figure 3:
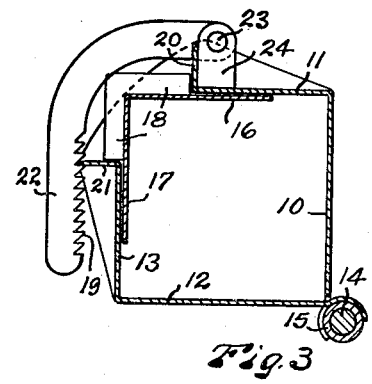
Fig. 3 is a cross section substantially on broken line 3—3 of Fig. 1, parts being shown in elevation.
Figure 5:
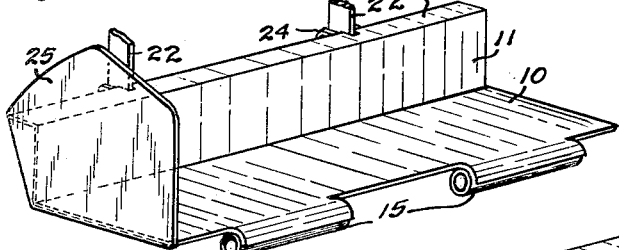
Figure 6:
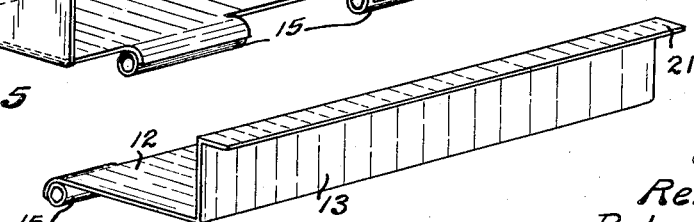

Figs. 1 to 6 inclusive disclose a rectangular meat mold embodying two rigidly connected side walls 10 and 11 forming one half shell and two other rigidly connected side walls 12 and 13 forming another similar half shell, said two half shells being hinged together at one corner of the mold as by a pivot pin 14 extending through interfitting tubular elements 15 which are secured to the respective walls 10 and 12. The walls 11 and 13 are of less width than the walls 10 and 12, as more clearly shown in Fig. 3, so that they do not come entirely together when the mold is closed and a trough like corner member formed of two integral walls 16 and 17 disposed at right angles to each other is used to form a closure for the corner of the receptacle diametrically opposite the hinge 14—15. This separable trough like member 16—17 serves to complete the closure of the mold receptacle and yet leaves the half shell members 10—11 and 12—13 adjustable whereby they may be partially closed at the time the meat is placed in the mold and then closed further during the process of cooking. Angular stop members 18 are provided preferably near each end of the trough like member 16—17 to limit the closing movement of the half shell members 10—11 and 12—13.

The edge of the wall 11 is bent outwardly at right angles to form a flange 20 and the edge of the wall 13 is similarly bent outwardly to form a corresponding flange 21. These flanges serve to brace and strengthen the respective walls with which they are connected and the flange 21 serves as a means with which ratchet teeth 19 on curved securing arms 22 may engage. The securing arms 22, preferably two in number, are connected by pivots 23 with lugs 24 on the wall 11.

An end plate 25 is rigidly secured to the half shell housing part 10—11 and the end of the other housing part is adapted to close in close proximity to this wall as shown in Fig. 1.

The closure for the other end of the mold housing is formed by a longitudinally movable end plate 26 which is supported by a rod 27. The rod 27 extends telescopically into a tubular socket member 28 and abuts against a compression spring 29 whereby the movable end plate 26 is yieldingly supported. The socket member 28 is slidably supported within a tubular guide member 30 and has an external spiral thread 31. One wall of the thread 31 is formed at substantially right angles to the axis of the socket member 28 and the other wall thereof is inclined. A spring pressed pawl 32 of bell crank shape, pivoted at 35, is arranged to engage with the thread 31 in the manner shown. The thread engaging end of the pawl is straight on one side so as to press against the straight side of the thread and is beveled on the other side so as to ride over the thread easily. A cross bolt 33 is provided in the outer end of the socket member 28 for turning said socket and to facilitate moving the same toward and away from the mold. The pawl 32 will prevent the socket 28 from moving away from the mold when said pawl is engaged with the thread 31 but will ride over the threads freely when the socket is moved toward the mold. When the pawl is released from the thread by pressure exerted on the outer end of said pawl adjacent the cross bolt 33 then the socket 28 may quickly and easily be moved away from the mold.

Rotation of the socket member 28 will also move the socket toward the mold, due to the thread 31, or permit said socket to be moved away from the mold, depending on the direction of such rotation.

The guide member 30 is preferably supported by an extension 34 on the end of the pivot bolt 14. This pivot bolt is preferably non-rotatably secured to the tubular hinge elements 15 of mold housing member or half shell formed by the walls 10—11 whereby it will swing with the member 10—11 and will not be left to swing loosely. Having both end members 25 and 26 connected with the same half shell member 10—11 also facilitates placing the meat in the mold.

In filling the mold the two half shell parts 10—11 and 12—13 are opened up, the trough like part 16—17 is removed and the movable end 26 is withdrawn to a point near the end of the mold housing. The meat is then placed in the mold housing part 10—11, the trough like part 16—17 is inserted and the two half shell parts are closed together and secured by engagement of the toothed members 22 with the flange 21, the meat being put under some pressure by force exerted on the exterior of the mold at the time of closing but the mold preferably not being entirely closed. Before the mold is closed the movable end plate 26 is moved inwardly to approximately the correct position, depending on the size of the filling. After closing the mold, the socket member 28 may be pressed inwardly far enough to fully compress the spring 29 thus exerting a constant pressure on the movable end plate 26 and putting the meat under pressure during the cooking process. As the meat cooks it will shrink to a certain extent. Part of this shrinkage will be taken up by the resiliently supported end plate 26 but we find it desirable not to close the mold entirely against the stop members 18 at the beginning but to cook the meat until substantially all of the shrinkage has taken place and then complete the closing of the mold down to the predetermined size limited by the stops 18.

The movable end plate 26 is adjustable to vary the length of the mold chamber for different amounts of meat or for hams of different size thus making it possible to keep the cross sectional size of the loaf of meat which is being cooked always the same.

In Figs. 7 and 8 we have shown a meat mold which is similar to the mold disclosed in the previous figures except that the respective walls 11 and 12 are made wider to afford a receptacle having greater width than depth, and a resiliently supported movable side plate 36 is placed within the mold housing adjacent the side wall 10. This plate 36 has springs 37 interposed between it and the wall 10 by which it is urged inwardly to thereby exert a pressure on the meat in the receptacle. By the use of this side plate 36 in combination with the spring pressed end plate a resilient pressure is exerted on the meat from one side and one end during the cooking process thus keeping the meat fully compressed as it shrinks in cooking. When this mold is filled the side plate 36 will be forced back against the pressure of the springs 37 and a narrow opening will be left along side of the movable end plate 26 but the meat will not crowd out through this opening. As the meat shrinks in cooking the side plate 36 will move inwardly until it will be in contact with or close to, the end plate 26. When this side plate 36 reaches the limit of its inward movement the cross sectional shape of the meat loaf will be substantially square and of the desired size. When the spring pressed side plate 36 is used the mold may be entirely closed at the time the meat is placed therein and no manual take up to compensate for shrinkage during the cooking process is required.

In Fig. 9 we have shown a cross sectional view of a cylindrical mold constructed in accordance with our invention, said mold being formed of two approximately semi-cylindrical half shells 38 and 39 pivotally connected together along adjacent edges as at 40 so that they may be opened and closed. The non-pivoted edges of the half shells 38 and 39 are flanged outwardly as at 41 and 42. Lugs 43 on the flange 41 are connected by pivots 44 with arcuate holding members 45 having ratchet teeth 46 which engage with the flange 42. Only one lug 43 and pivot 44 and holding member 45 is shown but it will be understood that two of the holding members 45 will preferably be provided, as shown in the mold illustrated in Figs. 1 to 6 inclusive. A troughlike member 47 of arcuate cross sectional shape is adapted to be placed inside the half shell members 38 and 39 to bridge the space between the non-pivoted edges of said members. Stop means 48 is provided on the trough like member 47 for the edges of the members 38 and 39 to abut against when they have been brought to the predetermined fully closed position. A movable end plate 49 of circular shape is provided within one end of the cylindrical mold receptacle. This circular end plate 49 corresponds to the square end plate 26 and is yieldingly and movably supported in a similar manner.

It will be apparent that the several parts in the cylindrical mold shown in Fig. 9 are substantially the same as corresponding parts disclosed in Figs. 1 to 6 except that their shape is altered to produce a cylindrical loaf instead of a square loaf. The operation of the device shown in Fig. 9 is substantially the same as the previously described operation of the device shown in Figs. 1 to 6.

The foregoing description and accompanying drawings clearly disclose a preferred embodiment of our invention but it will be understood that this disclosure is merely illustrative and that such changes in the invention may be made as are fairly within the scope and spirit of the following claims.

We claim:

1. In a meat mold, a relatively long hollow mold receptacle, a fixed end plate at one end of said mold receptacle, a movable end plate disposed within said mold receptacle adjacent the other end thereof, a shank on said movable end plate, a longitudinally adjustable socket member telescopically receiving said shank, a compression spring within said socket member abutting the end of said shank and yieldingly urging said movable end plate into said receptacle, a tubular guide member secured to the mold receptacle and supporting said socket member for longitudinal movement, and screw means adjustably positioning said socket member within said guide member.

2. In a meat mold, a relatively long hollow mold receptacle, a fixed end plate at one end of said mold receptacle, a movable end plate disposed within said mold receptacle adjacent the other end thereof, a shank on said movable end plate, a longitudinally adjustable socket member telescopically receiving said shank, means supporting said socket member, quick releasable means engaging and holding said socket member in adjusted position, and a compression spring within said socket member abutting the end of said shank and yieldingly urging said movable end plate into said receptacle.

3. A meat mold embodying a receptacle formed of two half shell members of a length in excess of their cross sectional dimensions, longitudinal hinge means pivotally connecting two adjacent edges of said half shell members, the other edges of said half shell members being spaced apart leaving an opening when said half shell members are in the closed position, a separable trough like closure member disposed to fit within said half shells and cover the opening between the edges thereof, stop means on said closure member positioned for engagement by said half shells, spring pressed movable end plate means within said half shells, said stop means limiting the closing movement of said half shells leaving said end plate means always free to move, and readily releasable securing means connecting the spaced apart edges of said half shells.

4. A meat mold embodying a receptacle formed of two half shell members of a length in excess of their cross sectional dimensions, longitudinal hinge means pivotally connecting two adjacent edges of said half shell members, the other edges of said half shell members being spaced apart leaving an opening when said half shell members are in the closed position, a separable trough like closure member disposed to fit within said half shells and cover the opening between the edges thereof, stop means on said closure member positioned for engagement by said half shells, a relatively fixed end plate on one end of one of said half shells, a movable end plate adjacent the other end of said half shells and supporting means for said movable end plate non-rotatably connected with one of said half shells whereby said movable end plate will swing with the half shell to which it is connected.

5. In a meat mold, a rectangular receptacle of greater length than width embodying two halves each formed of a wider and a narrower wall rigidly connected with each other, longitudinally extending pivot means hingedly connecting the edges of said wider walls, the narrower walls of said half shells terminating short of the corner which is diagonally opposite from the hinged corner of said receptacle when the two halves are in fully closed position, a trough like member disposed within said receptacle halves and closing said opening, stop means on said trough like member engageable by said spaced apart edges whereby closing movement of said two half shells will be stopped in a position in which the walls of said half shells form a receptacle of substantially square cross section, end members for said receptacle and readily releasable means connecting the spaced apart edges of said narrower walls together.

6. In a meat mold, a receptacle, an end plate movable within said receptacle, a shank on said end plate, a socket member telescopically receiving said shank, a compression spring within said socket abutting the end of said shank and yieldingly urging said movable end plate into said receptacle, ratchet like teeth on the exterior of said socket member, a guide member fixedly supported from said receptacle and slidably receiving said socket member and a spring pressed pawl on said guide member engaging the ratchet like teeth on said socket member.

7. In a meat mold, a receptacle formed of two half shells of a length in excess of their cross sectional dimensions, longitudinal hinge means pivotally connecting two adjacent edges of said half shells, a movable end plate disposed within said receptacle, and supporting means for said movable end plate fixedly connected with one of said half shells whereby said movable end plate will swing with the half shell to which it is connected when said half shell is moved on its pivot relative to the other half shell.

ARTHUR W. POLLOCK.
BOLESLAW RITTHAMER.
RENÉ ROTH.
JOHN IVOR JOHNSON.